US006841954B2

(12) United States Patent
Nakabayashi

(10) Patent No.: US 6,841,954 B2
(45) Date of Patent: Jan. 11, 2005

(54) APPARATUS AND METHOD USED IN DISK DRIVE FOR DRIVING SPINDLE MOTOR

(75) Inventor: Yoichi Nakabayashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 43 days.

(21) Appl. No.: 10/442,922

(22) Filed: May 22, 2003

(65) Prior Publication Data

US 2004/0212332 A1 Oct. 28, 2004

(30) Foreign Application Priority Data

Jul. 31, 2002 (JP) ........................................ 2002-223522

(51) Int. Cl.[7] ................................................ H02P 7/00
(52) U.S. Cl. .................... 318/62; 318/254; 318/280; 318/439; 318/603; 360/68; 360/73.03; 360/75; 360/78.04
(58) Field of Search ............................. 318/60–65, 138, 318/254, 439, 601; 60/71, 73.03, 73.04, 75

(56) References Cited

U.S. PATENT DOCUMENTS

| 5,161,073 A | * | 11/1992 | Gami et al. .............. 360/73.03 |
| 5,208,518 A | * | 5/1993 | Grapenthin et al. ........ 318/138 |
| 5,246,479 A | * | 9/1993 | Gami et al. .............. 360/73.03 |
| 5,623,379 A | | 4/1997 | Nishimura et al. |
| 6,377,015 B1 | | 4/2002 | Nakabayashi et al. |
| 6,643,087 B1 | * | 11/2003 | Kuroki et al. ................. 360/75 |
| 6,765,746 B2 | * | 7/2004 | Kusumoto .................... 360/75 |
| 2002/0141102 A1 | * | 10/2002 | Kusumoto .................... 360/75 |
| 2003/0174428 A1 | * | 9/2003 | Sakamoto ..................... 360/70 |
| 2003/0227707 A1 | * | 12/2003 | Kokami et al. ................ 360/75 |
| 2004/0070862 A1 | * | 4/2004 | Ranmuthu .................... 360/68 |
| 2004/0100722 A1 | * | 5/2004 | Kokami ........................ 360/75 |

FOREIGN PATENT DOCUMENTS

| EP | 0 584 855 A1 | 3/1994 |
| JP | 8-45175 | 2/1996 |
| JP | 8-249806 | 9/1996 |
| JP | 8-275579 | 10/1996 |
| WO | WO 02/43064 A2 | 5/2002 |

\* cited by examiner

Primary Examiner—Paul Ip
(74) Attorney, Agent, or Firm—Pillsbury Winthrop LLP

(57) ABSTRACT

A CPU sets an SPM driver in SPM start-up mode when a SPM is started up. At this time, a voltage selector applies, to a driver circuit, a voltage (high voltage) boosted by a voltage booster. A starter control circuit controls, during the period of an SPM start-up mode, the driver circuit with the high voltage applied thereto, thereby starting up the SPM. After the SPM has been started up, the CPU sets the SPM driver in PWM mode. At this time, the voltage selector switches the voltage applied to the driver circuit, from the boosted voltage to the voltage (low voltage) of a power supply. During the period of the PWM mode, a PWM circuit controls the driver circuit with the low voltage applied thereto, so as to rotate the SPM at a rated speed.

11 Claims, 2 Drawing Sheets

APPARATUS AND METHOD USED IN DISK DRIVE FOR DRIVING SPINDLE MOTOR

CROSS-REFERENCE TO RELATED APPLICATIONS

This application is based upon and claims the benefit of priority from the prior Japanese Patent Application No. 2002-223522, filed Jul. 31, 2002, the entire contents of which are incorporated herein by reference.

BACKGROUND OF THE INVENTION

1. Field of the Invention

The present invention relates to a disk drive using a disk as a recording medium, and more particularly to an apparatus and method for driving a spindle motor to rotate the disk, having a low power consumption.

2. Description of the Related Art

In general, disk drives using disks as a recording medium utilize a motor, called a spindle motor, to rotate the disks at high speed. Spindle motors are brushless DC motors. The power supply voltage for disk drives is directly used as that for the spindle motor. The power supply voltage for disk drives is generally a high voltage sufficient to reliably drive the spindle motor. However, if the spindle motor is powered by a high voltage for a long period of time, the power consumption increases.

The disk drives used in portable personal computers run on batteries, and recently, battery-powered radio-linked disk drives have become available. The power consumption of these types of disk drive is thus required to be reduced, if they are designed to be used for long periods of time.

To this end, Japanese Patent Application KOKAI Publication No. 8-45175 (hereinafter referred to as a prior art document) describes a technique (hereinafter referred to as prior art) for reducing the power consumption of a disk drive (in particular, the power consumption of motor driving means in the disk drive). In the prior art, two power supplies (power supply means) of different voltages, and power selection means are employed. The power selection means selects one of the power supplies in accordance with the rotational speed of the motor for rotating disks, the torque of the motor, or a change in the rotational speed of the motor, thereby causing the selected power supply to supply power to the motor driving means. Specifically, to rotate the motor at 2400 rpm (revolutions per minute), a 12V power supply is selected. On the other hand, to rotate the motor at 600 rpm, a 5V power supply is selected. Further, if the torque of the motor needed to rotate a disk with a head out of contact with the disk is 20 g·cm, the 5V power supply is selected. On the other hand, if the torque of the motor needed to rotate the disk with the head kept in contact with the disk is 80 g·cm, the 12V power supply is selected. Furthermore, in a disk drive in which switching of rotational speeds is needed to be accomplished quickly, a high-voltage power supply is selected for quick switching. Thus, in the prior art, the power consumption of the disk drive is reduced by switching the power supplies in accordance with the rotational speed of the motor for rotating disks, the torque of the motor, or a change in the rotational speed of the motor.

As stated above, the prior art needs at least two power supplies of different voltages. Further, there is a recent tendency to reduce the voltage of the power supply for the disk drive, thereby reducing the power consumption of the entire disk drive. However, if the voltage of the power supply for the disk drive is reduced, it is difficult to, for example, start up the motor when the disk drive is turned on. Nothing about this problem and its solving means is referred to in the prior art document.

BRIEF SUMMARY OF THE INVENTION

According to an embodiment of the invention, there is provided a disk drive using a disk as a recording medium. The disk drive comprises a spindle motor, driver circuit, first control circuit, second control circuit, voltage booster, voltage selector and controller. The spindle motor rotates the disk. The driver circuit drives the spindle motor by supplying a current to the spindle motor. The first control circuit controls the spindle motor via the driver circuit to start up the spindle motor in a first mode. The second control circuit controls the spindle motor via the driver circuit to rotate the spindle motor at a rated speed in a second mode. The voltage booster boosts a power supply voltage from a disk drive power supply. The voltage selector selects, in the first mode as a voltage applied to the driver circuit, the power supply voltage boosted by the booster, and selects, in the second mode as the voltage applied to the driver circuit, the power supply voltage from the disk drive power supply. The controller sets the first mode to start up the spindle motor, and sets the second mode when the spindle motor has been started up.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Referring to the accompanying drawings, a description will be given of an embodiment in which the invention is applied to a hard disk drive.

Figure 1:
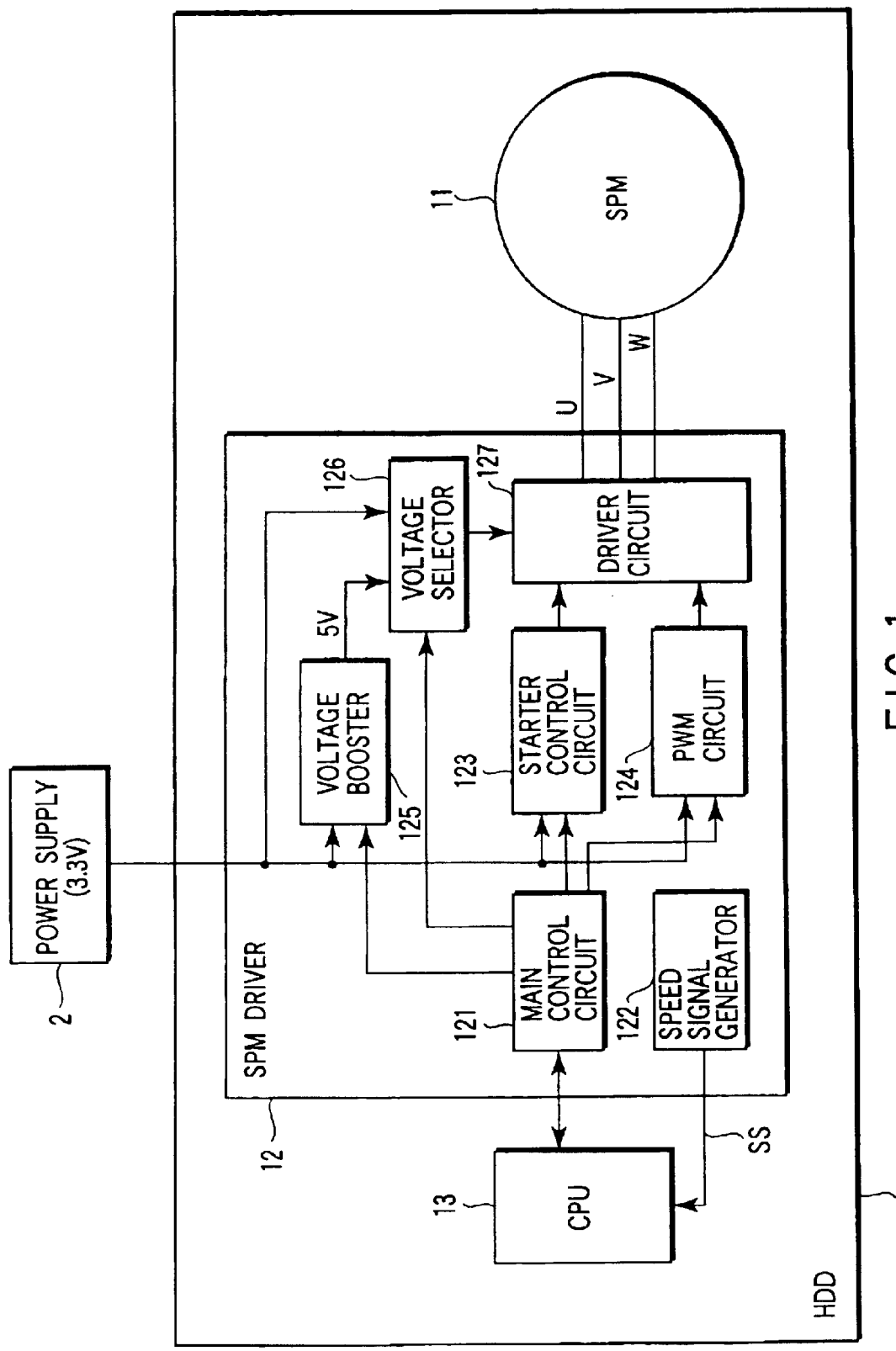
FIG. 1 is a block diagram illustrating the configuration of a hard disk drive according to an embodiment of the invention.

FIG. 1 is a block diagram illustrating the configuration of a hard disk drive (hereinafter referred to as an "HDD") 1 according to the embodiment of the invention. The HDD 1 of FIG. 1 is connected to a power supply (low voltage power supply) 2 represented by a battery. The voltage of the power supply 2 is, for example, 3.3V, which is lower than a conventional power supply voltage of 5V.

The HDD 1 comprises a spindle motor (hereinafter referred to as a "SPM") 11, SPM driver 12 and CPU 13. The SPM 11 rotates magnetic disks (not shown) used as a recording medium for the HDD 1. The SPM 11 has a three-phase, twelve-pole motor coil expressed by, for example, U, V and W. The SPM driver 12 supplies current to the SPM 11 to drive it. The CPU 13 is a controller for controlling each component of the HDD 1 in accordance with a control program stored in a nonvolatile memory, such as a ROM (not shown). This control program includes a start-up routine for starting up the SPM 11 and rotating it at a predetermined speed. Writing and reading of data to and from a disk is executed while the disk is being rotated by the SPM 11 at a predetermined speed. This predetermined rotational speed is called a rated speed (steady-state rotational speed). In this embodiment, the rated speed is 4,200 rpm. When the SPM 11 is rotating within the rotational speed range of 4,200 rpm±Δ (Δ is a tolerance), the SPM 11 is considered to be in a rated rotational state (steady rotational state). The rotational speed within the range of 4,200 rpm±Δ may be called the rated speed.

The SPM driver 12 comprises a main control circuit 121, speed signal generator 122, starter control circuit 123, PWM circuit 124, voltage booster 125, voltage selector 126 and driver circuit 127. The main control circuit 121 controls the voltage booster 125 in accordance with an instruction from the CPU 13. The main control circuit 121 further controls the starter control circuit 123, PWM circuit 124 or voltage selector 126 in accordance with a mode for driving the SPM 11 (SPM driving mode), which is set by the CPU 13. The SPM driving mode includes SPM start-up mode and PWM mode. The SPM start-up mode is for starting up the SPM 11. The PWM mode is for rotating the SPM 11 at the rated speed by pulse width modulation (PWM) control.

The speed signal generator 122 generates a signal (hereinafter referred to as a speed signal) SS of a frequency proportional to the rotational speed of the SPM 11. The speed signal SS is formed of a series of pulses, each of which occurs in the cycle determined from the rotational speed of the SPM 11. The speed signal SS generated by the speed signal generator 122 is supplied to the CPU 13. The starter control circuit 123 assumes an operable state (ON state) only in the SPM start-up mode. The starter control circuit 123 is a first control circuit for controlling, in the operable state, the start-up of the SPM 11 in accordance with a predetermined sequence. The PWM circuit 124 assumes an operable state only in the PWM mode. The PWM circuit 124 is a second control circuit for controlling the SPM 11 by PWM in the operable state, so as to rotate it at the rated speed.

The voltage booster 125 boosts the voltage (3.3V) of the power supply 2 to a predetermined voltage, such as 5V. The voltage selector 126 switches (selects) the power supply voltage applied to the driver circuit 127 under the control of the main control circuit 121. In this embodiment, the power supply voltage of the driver circuit 127 is switched between the power supply voltage (3.3V) from the power supply 2 of the HDD 1, and the power supply voltage (5V) boosted by the voltage booster 125.

The driver circuit 127 is powered by the power supply voltage selected by the voltage selector 126, thereby supplying a current (SPM current) to the SPM 11 under the control of the starter control circuit 123 or PWM circuit 124. More specifically, the driver circuit 127 supplies each phase U, V or W of the SPM 11 with the SPM current designated by the starter control circuit 123 or PWM circuit 124, at the points in time also designated by the starter control circuit 123 or PWM circuit 124.

Figure 2:
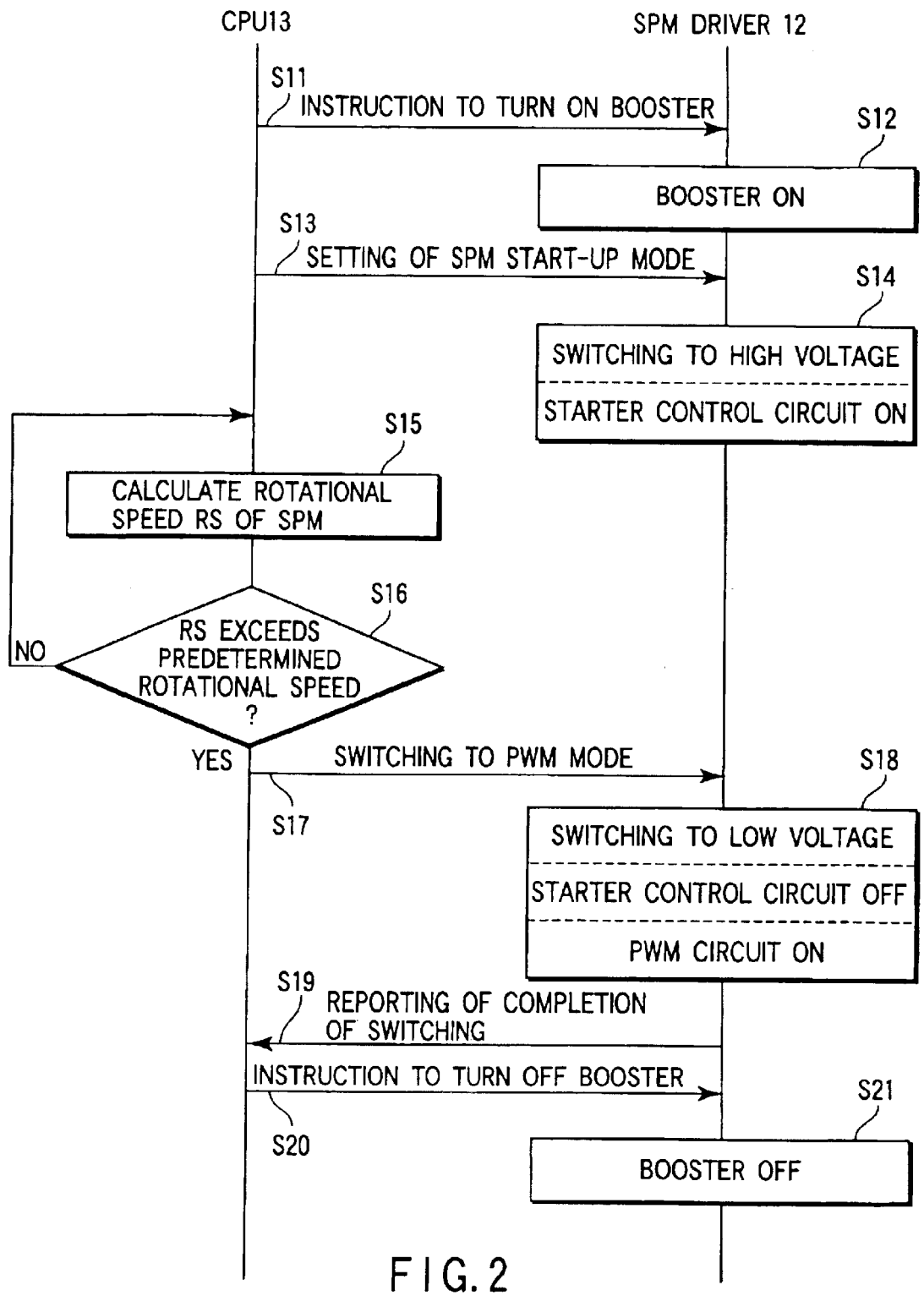
FIG. 2 is a sequence chart useful in explaining the procedure of control executed to start up a spindle motor (SPM) 11 and rotate it at a predetermined speed.

Referring to the sequence chart of FIG. 2, a description will now be given of the procedure of control executed to start up the SPM 11 and rotate it at the rated speed. When, for example, the power supply 2 has been turned on and the SPM 11 needs to be started up, the CPU 13 supplies the main control circuit 121 of the SPM driver 12 with an instruction to turn on the booster (step S11). Upon receiving the instruction, the main control circuit 121 turns on the voltage booster 125 (step S12). As a result, the voltage booster 125 boosts, to 5V, the voltage of 3.3V from the power supply 2.

On the other hand, after supplying the booster-ON-instruction, the CPU 13 causes the main control circuit 121 to set the SPM driver 12 in the SPM start-up mode (step S13). When the SPM driver 12 has been set in the SPM start-up mode, the main control circuit 121 executes the following processing at a step S14. The main control circuit 121 controls the voltage selector 126 so as to select the power supply voltage boosted to 5V by the voltage booster 125. The boosted power supply voltage of 5V is applied to the driver circuit 127 as the power supply voltage for it. In other words, the main control circuit 121 switches the power supply voltage applied to the driver circuit 127 from the power supply voltage of 3.3V, from the power supply 2 of the HDD 1, to the boosted voltage of 5V (high voltage). The main control circuit 121 also turns on the starter control circuit 123 at the step S14.

When the starter control circuit 123 has been turned on by the main control circuit 121, it starts up the SPM 11 by controlling the driver circuit 127 in accordance with a predetermined sequence. To start up the SPM 11, a sufficient start-up torque is needed. Therefore, if the voltage of 3.3V (low voltage) output from the power supply 2 is used as the power supply voltage applied to the driver circuit 127, the SPM 11 cannot be started up, or much time may be required to increase the rotational speed of the SPM 11 to the rated speed. However, in the embodiment, in the SPM start-up mode, the voltage of 5V (high voltage) boosted by the voltage booster 125 is used as the power supply voltage applied to the driver circuit 127. This enables the SPM 11 to be started up quickly.

When the CPU 13 has set the SPM driver 12 in the SPM start-up mode, it calculates the present rotational speed RS of the SPM 11 (step S15). The rotational speed RS of the SPM 11 is calculated from the cycle of each pulse contained in the speed signal output from the speed signal generator 122 of the SPM driver 12. Subsequently, the CPU 13 determines whether or not the rotational speed RS of the SPM 11 exceeds a predetermined rotational speed (step S16). This predetermined rotational speed is set to a value slightly lower than the rated speed (4,200 rpm), such as 4,000 rpm. The CPU 13 repeats the steps S15 and S16 at regular intervals until the rotational speed RS of the SPM 11 exceeds the predetermined value.

When the rotational speed RS of the SPM 11 exceeds the predetermined value, the CPU 13 determines that the SPM 11 has been started up. At this time, the CPU 13 instructs the main control circuit 121 to set the PWM mode, thereby switching the SPM driver 12 from the SPM start-up mode to the PWM mode (step S17). When the SPM driver 12 has been switched from the SPM start-up mode to the PWM mode, the main control circuit 121 executes the following processing at a step S18. The main control circuit 121 controls the voltage selector 126 so as to switch the power supply voltage applied to the driver circuit 127 from the voltage boosted to 5V by the voltage booster 125 to the low voltage (3.3V) of the power supply 2. Further, the main control circuit 121 switches the starter control circuit 123 to the OFF state (inoperable state) and the PWM circuit 124 to the ON state (operable state) at the step S18.

After the execution of the step S18, the main control circuit 121 informs the CPU 13 of the completion of switching (step S19). When informed of the completion of switching, the CPU 13 supplies the main control circuit 121 with an instruction to turn off the booster (step S20). Upon receiving the instruction from the CPU 13, the main control circuit 121 switches the voltage booster 125 to the OFF state (inoperable state) (step S21).

When the PWM circuit 124 has been turned on in the PWM mode by the main control circuit 121, it controls the driver circuit 127 by PWM, in order to rotate the SPM 11 at the rated speed. The period in which the SPM 11 is rotated at the rated speed is much longer than the period required to start up the SPM 11. Therefore, it is demanded to minimize power consumption during the rotation of the SPM 11 at the rated speed. When the SPM 11 is rotated at the rated speed, the current supplied is constant, regardless of the power supply voltage applied to the driver circuit 127. Accordingly, the lower the voltage applied to the driver circuit 127, the smaller the power consumption. In light of this, in the embodiment, the voltage of 3.3V (low voltage) output from the power supply 2 is used as the power supply voltage applied to the driver circuit 127 in the PWM mode in which the SPM 11 is rotated at the rated speed. As a result, the power consumption of the HDD 1 is reduced during the steady-state rotation of the SPM 11. Moreover, in the embodiment, to rotate the SPM 11 at the rated speed, the driver circuit 127 is controlled by the PWM circuit 124 using PWM. As a result, the driver circuit 127 is turned on/off (switched) at a high speed. This control reduces the power consumption of the driving circuit 127, compared to linear control for controlling the driver circuit 127 without turning it on/off.

If the power supply voltage applied to the driver circuit 127 for driving the SPM 11 is reduced (in the embodiment, from 5V to 3.3V), the rated torque of the SPM 11 is also reduced. In light of this, it is advisable to reduce the number of windings of the motor coil or the strength of the magnet of the SPM 11 in accordance with a reduction in power supply voltage. If a thus-modified SPM 11 is used, the torque constant Kt of the SPM 11 is reduced, thereby compensating for the reduction in the rated torque. However, if Kt is kept low, the power consumption of the SPM 11 is increased. In light of this, an SPM 11 having a low friction torque (running torque) is used. If the SPM 11 is a ball bearing SPM, it is desirable to use a grease of a low viscosity and low penetration, to reduce the friction torque of the SPM 11. As the material of the balls, it is preferable to use, for example, a ceramic having a low rolling resistance. Further, if the SPM 11 is a fluid dynamics bearing SPM, it is preferable to use an oil of a low viscosity for fluid dynamics bearings.

In the embodiment, the present invention is applied to an HDD (hard disk drive) equipped with an SPM for rotating magnetic disks. However, the invention is not limited to this, and is also applicable to other types of disk drive, such as a magneto-optical disk drive with an SPM for rotating magneto-optical disks, an optical disk drive with an SPM for rotating optical disks, etc.

What is claimed is:

1. A disk drive using a disk as a recording medium, comprising:
   a spindle motor which rotates the disk;
   a driver circuit which drives the spindle motor by supplying a current to the spindle motor;
   a first control circuit which controls the spindle motor via the driver circuit to start up the spindle motor in a first mode;
   a second control circuit which controls the spindle motor via the driver circuit to rotate the spindle motor at a rated speed in a second mode;
   a voltage booster which boosts a power supply voltage from a disk drive power supply;
   a voltage selector which selects, in the first mode as a voltage applied to the driver circuit, the power supply voltage boosted by the booster, and selects, in the second mode as the voltage applied to the driver circuit, the power supply voltage from the disk drive power supply; and
   a controller which sets the first mode to start up the spindle motor, and sets the second mode when the spindle motor has been started up.

2. The disk drive according to claim 1, wherein the second control circuit controls, using pulse width modulation, the spindle motor to rotate it at the rated speed.

3. The disk drive according to claim 1, further comprising a main control circuit which controls the first control circuit, the second control circuit and the voltage selector, depending upon whether the controller has set the first mode or the second mode.

4. The disk drive according to claim 3, wherein:
   if the controller sets the first mode, the main control circuit causes the voltage selector to select the power supply voltage boosted by the voltage booster, and operates the first control circuit; and
   if the first mode is switched to the second mode, the main control circuit causes the voltage selector to select the power supply voltage from the disk drive power supply, stops an operation of the first control circuit and operate the second control circuit.

5. The disk drive according to claim 1, wherein the controller monitors a rotational speed of the spindle motor in the first mode, and determines that the spindle motor has been started up if the rotational speed of the spindle motor exceeds a predetermined value that is lower than the rated speed.

6. The disk drive according to claim 1, wherein the controller operates the voltage booster before the first mode is set, and stops an operation of the voltage booster after the first mode is switched to the second mode.

7. A spindle motor driver for use in a disk drive using a disk as a recording medium, the spindle motor driver driving a spindle motor which rotates the disk, comprising:
   a driver circuit which drives the spindle motor by supplying a current to the spindle motor;
   a first control circuit which controls the spindle motor via the driver circuit to start up the spindle motor;
   a second control circuit which controls the spindle motor via the driver circuit to rotate the spindle motor at a rated speed;
   a voltage booster which boosts a power supply voltage from a disk drive power supply;
   a voltage selector which selects, as a voltage applied to the driver circuit, one of the power supply voltage from the disk drive power supply and the power supply voltage boosted by the booster; and
   a main control circuit which controls the first control circuit, the second control circuit and the voltage selector, the main control circuit operating the first control circuit and causing the voltage selector to select the power supply voltage boosted by the voltage booster, if the spindle motor is in a first mode in which the spindle motor is started up, and the main control circuit stopping an operation of the first control circuit, operating the second control circuit and causing the voltage selector to select the power supply voltage from the disk drive power supply, if the spindle motor is in a second mode in which the spindle motor is rotated at a rated speed.

8. The spindle motor driver according to claim 7, wherein the second control circuit controls, using pulse width modulation, the spindle motor to rotate it at the rated speed.

9. A method, for use in a disk drive using a disk as a recording medium, of driving a spindle motor which rotates the disk, the method comprising:

setting a first mode when the spindle motor is started up;

switching the first mode to a second mode when the spindle motor has been started up;

controlling, in the first mode, a driver circuit which drives the spindle motor, to start up the spindle motor;

controlling, in the second mode, the driver circuit to rotate the spindle motor at a rated speed;

boosting, using a booster, a power supply voltage from a disk drive power supply;

applying, to the driver circuit in the first mode, the power supply voltage boosted by the booster; and applying the power supply voltage from the disk drive power supply to the driver circuit in the second mode.

10. The method according to claim 9, further comprising:

monitoring a rotational speed of the spindle motor in the first mode; and determining that the spindle motor has been started up if the rotational speed of the spindle motor exceeds a predetermined value lower than the rated speed.

11. The method according to claim 9, further comprising:

operating the voltage booster before the first mode is set; and stopping an operation of the voltage booster after the first mode is switched to the second mode.

* * * * *